US010686341B2

(12) United States Patent
Sano et al.

(10) Patent No.: US 10,686,341 B2
(45) Date of Patent: Jun. 16, 2020

(54) ROTATING ELECTRIC MACHINE

(71) Applicant: TOYOTA JIDOSHA KABUSHIKI KAISHA, Toyota-shi, Aichi-ken (JP)

(72) Inventors: Shinya Sano, Toyota (JP); Hiroyuki Hattori, Okazaki (JP); Yasuhide Yagyu, Nagakute (JP); Takanori Kadota, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 22 days.

(21) Appl. No.: 16/125,147

(22) Filed: Sep. 7, 2018

(65) Prior Publication Data

US 2019/0089216 A1    Mar. 21, 2019

(30) Foreign Application Priority Data

Sep. 15, 2017   (JP) .................................. 2017-177895

(51) Int. Cl.
  *H02K 1/27*    (2006.01)
  *H02K 3/12*    (2006.01)
  *H02K 7/00*    (2006.01)
  *H02K 1/16*    (2006.01)

(52) U.S. Cl.
  CPC .......... *H02K 1/2766* (2013.01); *H02K 1/165* (2013.01); *H02K 3/12* (2013.01); *H02K 7/006* (2013.01)

(58) Field of Classification Search
  CPC ........ H02K 1/27; H02K 1/276; H02K 1/2766; H02K 1/2773
  USPC .......................... 310/156.53, 156.56, 156.57
  See application file for complete search history.

(56) References Cited

U.S. PATENT DOCUMENTS

| 2010/0237735 A1* | 9/2010 | Blissenbach |
| 2013/0320797 A1* | 12/2013 | Vyas |
| 2016/0248282 A1 | 8/2016 | Jurkovic et al. |

FOREIGN PATENT DOCUMENTS

| JP | 4900132 B2 | 3/2012 |
| JP | 2014-200150 A | 10/2014 |
| WO | 2009/063350 A2 | 5/2009 |
| WO | 2013/133474 A1 | 9/2013 |

OTHER PUBLICATIONS

Jan. 23, 2019 Extended Search Report issued in European Patent Application No. 18194097.4.

* cited by examiner

*Primary Examiner* — Alfonso Perez Borroto
*Assistant Examiner* — Alexander Moraza
(74) *Attorney, Agent, or Firm* — Oliff PLC

(57) ABSTRACT

A rotor of a rotating electric machine includes a rotor core, and a plurality of permanent magnets arranged in a two-layer structure having a first layer and a second layer, in the rotor core. Among the permanent magnets, first and second outermost permanent magnets located closest to each of opposite q-axes of each magnetic pole are located relative to each other, such that a radial position of an end portion on a q-axis side and a radially inner side in the first outermost permanent magnet that belongs to the first layer is spaced by a predetermined radial spacing from and is on a radially outer side of a radial position of an end portion on the q-axis side and a radially outer side in the second outermost permanent magnet that belongs to the second layer.

4 Claims, 3 Drawing Sheets

ROTATING ELECTRIC MACHINE

INCORPORATION BY REFERENCE

The disclosure of Japanese Patent Application No. 2017-177895 filed on Sep. 15, 2017 including the specification, drawings and abstract is incorporated herein by reference in its entirety.

BACKGROUND

1. Technical Field

The disclosure relates to a rotating electric machine, and particularly to a rotating electric machine having a rotor including a plurality of permanent magnets arranged in a plural-layer structure in each magnetic pole.

2. Description of Related Art

As one type of a rotating electric machine for use in an electric vehicle, an embedded magnet type rotating electric machine is used in which a plurality of permanent magnets are embedded along a circumferential direction of a rotor core, to form magnetic poles, in order to reduce the size and weight of the machine and improve the output efficiency. The embedded magnet type rotating electric machine generates composite torque of magnet torque generated through cooperation of a rotating magnetic field of a stator and the permanent magnets, and reluctance torque generated based on the magnetic anisotropy of the rotor core. The output efficiency can be further improved by arranging the embedded magnets in substantially V configuration in one magnetic pole. Also, torque to be generated can be further increased by forming two layers of embedded magnets in radial directions.

In an embedded magnet type rotating electric machine described in Japanese Unexamined Patent Application Publication No. 2014-200150 (JP 2014-200150 A), two first permanent magnets are disposed symmetrically with respect to a d-axis as a centerline, and two second permanent magnets are disposed on the radially outer side (closer to the stator) of the first permanent magnets, symmetrically with respect to the d-axis, in one magnetic pole of a rotor. Here, the four permanent magnets are arranged so as not to overlap with each other as viewed from the stator teeth via a clearance. With this arrangement, output torque is improved at middle to high speeds, except for the maximum torque at low speeds, as compared with a magnet arrangement in which four magnets overlap with each other as viewed in the same direction, as shown in FIG. 3 of JP 2014-200150A.

SUMMARY

In a rotating electric machine including a rotor having a plurality of layers of embedded magnets, interference may occur between magnetic fluxes of the permanent magnets of adjacent layers, and the maximum torque characteristic, etc. of the rotating electric machine may deteriorate due to magnetic saturation. Thus, it is desired to provide a rotating electric machine in which interference between magnetic fluxes of permanent magnets of adjacent layers is less likely to occur, and magnetic saturation is mitigated, in a rotor having a plurality of layers of embedded magnets, so that the maximum torque characteristic, etc. are less likely or unlikely to deteriorate.

A rotating electric machine according to this disclosure includes a stator on which a stator coil is wound, and a rotor disposed on a radially inner side of the stator, concentrically with the stator, with a predetermine clearance between the rotor and the stator. The rotor includes a rotor core having a plurality of magnetic poles arranged in a circumferential direction, and a plurality of permanent magnets. The permanent magnets in each of the magnetic poles are arranged in a plural-layer structure that extends radially inward from a d-axis intersection point at which a d-axis intersects with an outer circumferential surface of the rotor core. In the rotating electric machine, the plural-layer structure includes a first layer and a second layer as two adjacent layers, and the first layer is closer to the d-axis intersection point than the second layer. The permanent magnets that belong to the first layer and the second layer respectively include first and second outermost permanent magnets located closest to each of opposite q-axes of the magnetic pole. The first and second outermost permanent magnets are located relative to each other, such that a radial position of an end portion on a q-axis side and a radially inner side in the first outermost permanent magnet that belongs to the first layer, in the rotor core, is spaced by a predetermined radial spacing from and is on a radially outer side of a radial position of an end portion on the q-axis side and a radially outer side in the second outermost permanent magnet that belongs to the second layer, in the rotor core.

In a flux path between two adjacent layers in the plural-layer structure, interference between magnetic fluxes produced by the permanent magnets of two layers is likely to occur, in a region in which two permanent magnets located closest to the q-axis as an inlet of flow of magnetic flux that generates magnet torque in the magnetic pole face each other. In the example of the above configuration, interference between the magnetic fluxes of two permanent magnets is likely to occur, in a region in which the end portion on the q-axis side and radially inner side in the permanent magnet that belongs to the first layer closer to the d-axis intersection point, and the end portion on the q-axis side and radially outer side in the permanent magnet that belongs to the second layer, face each other. According to the above arrangement, the end portions of the mutually facing two permanent magnets in this region are spaced from each other by the predetermined radial spacing. Thus, appropriate setting of the predetermined radial spacing makes it possible to reduce a possibility of interference between the magnetic fluxes of the permanent magnets of the adjacent layers, and mitigate magnetic saturation, so as to curb deterioration of the maximum torque characteristic, etc.

In the rotating electric machine as described above, the predetermined radial spacing may be set to a spacing that reduces a possibility of magnetic saturation caused by mutual intensification of magnetic flux of the permanent magnets that belong to the first layer, and magnetic flux of the permanent magnets that belong to the second layer, when the magnetic flux of the permanent magnets that belong to the first layer flows in the same direction as the magnetic flux of the permanent magnets that belong to the second layer.

With the above arrangement, the possibility of magnetic saturation due to interference between the magnetic fluxes of the permanent magnets of adjacent layers can be reduced by appropriately setting the predetermined radial spacing, so that the maximum torque characteristic, etc. of the rotating electric machine are improved.

In the rotating electric machine as described above, the predetermined radial spacing may be set to a spacing that reduces a possibility of mutual cancelling of magnetic flux of the permanent magnets that belong to the first layer, and magnetic flux of the permanent magnets that belong to the second layer, when the magnetic flux of the permanent magnets that belong to the first layer flows in a direction opposite to a direction in which the magnetic flux of the permanent magnets that belong to the second layer flows.

With the above arrangement, the possibility of mutual cancelling of magnetic fluxes due to interference between the magnetic fluxes of the permanent magnets of adjacent layers can be reduced by appropriately setting the predetermined radial spacing, so that the maximum torque characteristic, etc. of the rotating electric machine are improved.

In the rotating electric machine as described above, the permanent magnets of each layer of the plural-layer structure may be arranged symmetrically with respect to the d-axis.

When the rotating electric machine operates and the rotor rotates, the magnetic fluxes produced by the permanent magnets of two layers on the upstream q-axis side in the rotational direction in the magnetic pole are likely to intensify each other, and cause magnetic saturation, and the magnetic fluxes produced by the permanent magnets of two layers on the downstream q-axis side are likely to cancel out each other. With the above arrangement, the predetermined radial spacing on the upstream q-axis side in the rotational direction can be made equal to the predetermined radial spacing on the downstream q-axis side. Therefore, magnetic saturation and mutual cancellation of magnetic fluxes can be curbed or reduced in a well-balanced manner.

In the rotating electric machine as described above, the plural-layer structure may be a two-layer structure having the first layer and the second layer. The first layer may consist of two permanent magnets arranged symmetrically with respect to the d-axis and inclined at a first inclination angle as a predetermined acute angle, relative to the d-axis, as viewed from the outer circumferential surface of the rotor core. The second layer may consist of four permanent magnets including two radially outer permanent magnets that are arranged symmetrically with respect to the d-axis and inclined at a second inclination angle that is smaller than the first inclination angle, relative to the d-axis, as viewed from the outer circumferential surface of the rotor core, and two radially inner permanent magnets that are arranged symmetrically with respect to the d-axis and inclined at a third inclination angle that is an acute angle larger than the second inclination angle, relative to the d-axis, as viewed from the outer circumferential surface of the rotor core.

With the above arrangement, the second layer has a total of four permanent magnets, i.e., two magnets on the radially outer side and two magnets on the radially inner side; therefore, the magnet torque can be increased, as compared with the case where the second layer has two permanent magnets on the radially outer side. Also, the third inclination angle is made larger than the second inclination angle, so that the flux path between the permanent magnets of the first layer and the radially inner permanent magnets of the second layer becomes wider than the flux path between the permanent magnets of the first layer and the radially outer permanent magnets of the second layer. As a result, interference is less likely to occur between the magnetic flux of the permanent magnets of the first layer and the magnetic flux of the radially inner permanent magnets of the second layer. Thus, the maximum torque characteristic, etc. of the rotating electric machine can be further improved.

According to the rotating electric machine constructed as described above, in the rotor having embedded magnets in a plurality of layers, interference between magnetic fluxes of the permanent magnets of adjacent layers is less likely to occur, and magnetic saturation is mitigated, so that deterioration of the maximum torque characteristic, etc. can be curbed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
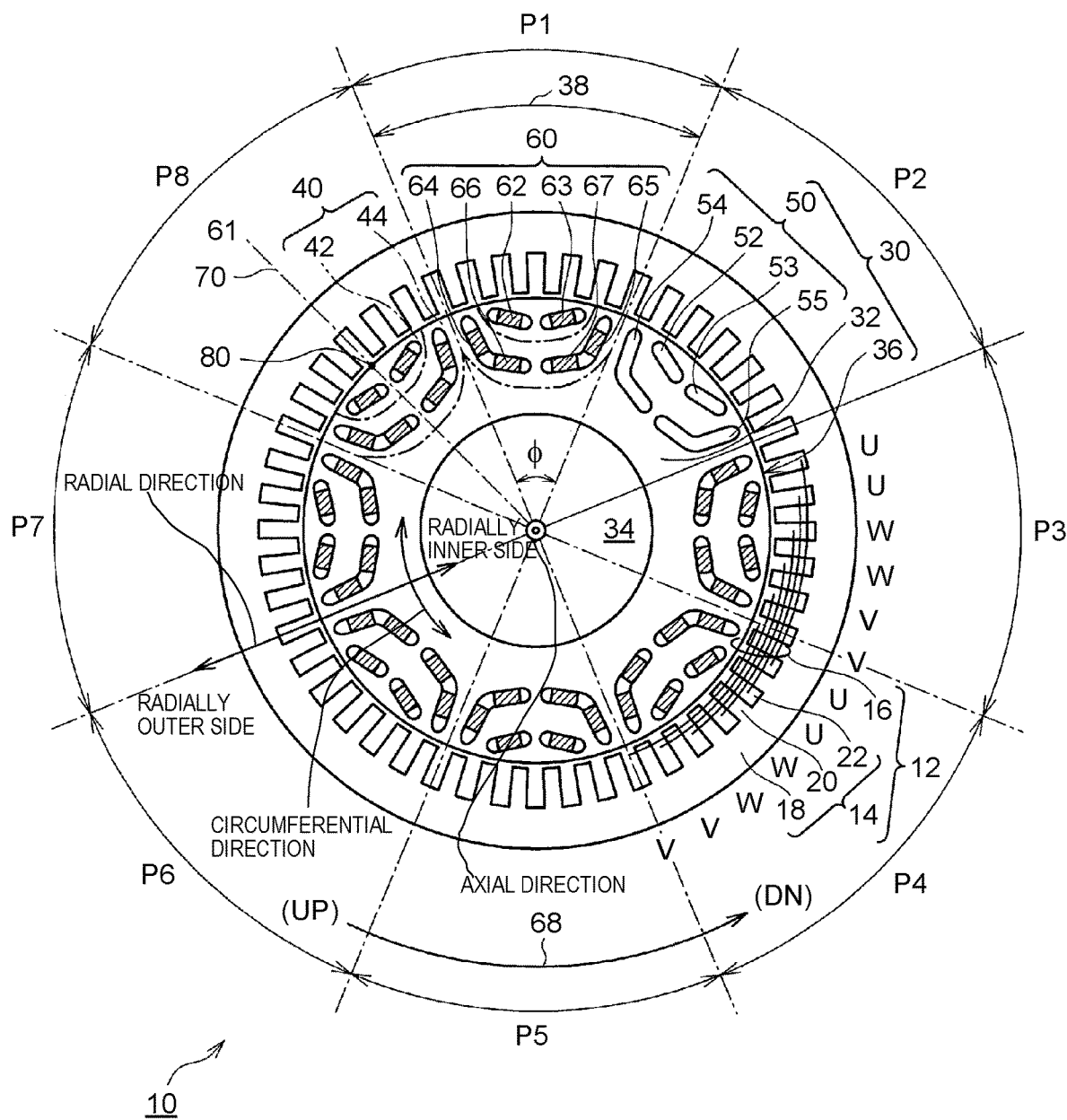
FIG. 1 is a top view of a rotating electric machine of one embodiment.

Referring to the drawings, one embodiment of the disclosure will be described in detail. While a rotating electric machine installed on a vehicle will be described below, for the purpose of illustration, the rotating electric machine of the disclosure may be used in applications other than installation on vehicles. While a method of winding a stator coil in this embodiment is distributed winding, this is a mere example for the purpose of illustration, and the winding method may be concentrated winding.

While permanent magnets are arranged in two-layer configuration in each magnetic pole of a rotor, this is a mere example for the purpose of illustration, and the permanent magnets may be arranged in two or more layers, for example, in three-layer configuration. In the two-layer configuration, two permanent magnets are disposed in a first layer, and four permanent magnets are disposed in a second layer; however, this is a mere example for the purpose of illustration, and the number of permanent magnets disposed in each layer may be changed as appropriate, according to the specifications, etc. of the rotating electric machine and the permanent magnets. For example, four permanent magnets may be disposed in the first layer, and six permanent magnets may be disposed in the second layer. In the plural-layer configuration structure of the permanent magnets in each magnetic pole, the two or more permanent magnets in each layer are arranged symmetrically with respect to a line, i.e., a d-axis as a magnetic-pole centerline of the magnetic pole. However, this example is a mere example for the purpose of illustration, and the permanent magnets may be arranged asymmetrically with respect to the d-axis. In the case where the specifications regarding the rotational direction of the rotating electric machine are fixed, for example, the asymmetric arrangement of the permanent magnets with respect to the d-axis may be more appropriate or suitable for the rotational direction.

The shapes, dimensions, the number of teeth and slots, the number of magnetic poles of the rotor, the number of permanent magnets, materials, and so forth are indicated as mere examples for the purpose of illustration, and these details may be changed as appropriate, according to the specifications of the rotating electric machine. In all of the drawings, the same reference numerals are assigned to the same or corresponding elements, which will not be repeatedly described.

FIG. 1 shows the configuration of the rotating electric machine 10 installed on the vehicle. The rotating electric machine 10 is a motor-generator that functions as an electric motor when the vehicle travels with power, and functions as a generator when a brake is applied to the vehicle, under control of a drive circuit (not shown). The rotating electric machine 10 is also a three-phase synchronous rotating electric machine. The rotating electric machine 10 consists principally of a stator 12, and a rotor 30 disposed on the radially inner side of the stator 12, with a given clearance provided between the rotor 30 and the stator 12.

The stator 12 of the rotating electric machine 10 includes a stator core 14 and a stator coil 16. The stator core 14 is an annular, magnetic component, and includes an annular back yoke 18, and a plurality of teeth 20 that protrudes radially inward from the back yoke 18. Spaces between adjacent ones of the teeth 20 are referred to as slots 22. In the embodiment of FIG. 1, the number of the teeth 20 is equal to the number of the slots 22, which is 48 as a multiple of three.

The stator core 14, which includes the back yoke 18 and the teeth 20, is a laminated body formed by stacking, in the axial direction, a given number of annular magnetic thin sheets formed in a given shape so as to form the slots 22. Opposite surfaces of the magnetic thin sheets are subjected to electrically insulating treatment. As a material of the magnetic thin sheets, silicon steel sheets as one type of electromagnetic steel sheets may be used. The stator core 14 may also be an integrally formed body of magnetic powder, instead of the laminated body of the magnetic thin sheets.

The stator coil 16 consists of three-phase distributed winding coils, and one phase winding is wound across two or more teeth 20. In FIG. 1, windings as a part of the stator coil 16 are illustrated. Here, "U", "V", "W" with which each slot 22 is labelled indicates the phase of the winding wound on the slot 22. For example, a U-phase winding is inserted into a given slot 22 labelled with "U", and extended from the given slot 22 in the circumferential direction, to be inserted into another slot 22 that is labelled with "U" next and spaced from the given slot 22 by a distance of six slots. Thus, U-phase windings are formed by repeating this process. Similarly, V-phase windings and W-phase windings are also formed in the same manner.

The rotor 30 is disposed concentrically with the stator 12, with a predetermined magnetic gap provided between the rotor 30 and the inner periphery of the stator 12. The rotor 30 includes a rotor core 32 as a magnetic body, and a plurality of permanent magnets 60 that is embedded in the rotor core 32 and forms magnetic poles 38 of the rotor 30.

The rotor core 32 is an annular magnetic body having a central hole 34 and an outer circumferential surface 36, and includes a plurality of magnet holes 50 in which the permanent magnets 60 are disposed. A rotor shaft as an output shaft of the rotating electric machine 10 is fixed to the central hole 34 of the rotor core 32.

The radial directions, circumferential direction, and axial direction of the rotating electric machine 10 are shown in FIG. 1. The center position of the central hole 34 is denoted as "C", and the radial directions are indicated by radial lines connecting the center position C and the outer periphery of the stator 12. The center position C is on the radially inner side, and the outer periphery of the stator 12 is on the radially outer side. The circumferential direction is a direction extending along a circle having the center position C as its center. The axial direction is a direction in which the rotor shaft inserted in the central hole 34 extends, and is perpendicular to the paper of FIG. 1.

The rotor core 32 is formed by stacking, in the axial direction, a given number of annular, magnetic thin sheets formed in a given shape including the central hole 34 and a plurality of magnet holes 50. As a material of the magnetic thin sheets, electromagnetic steel sheets may be used, like the stator core 14. The rotor core 32 may be an integrally formed body of magnetic powder, instead of the laminated body of the magnetic thin sheets.

The rotor 30 is provided with the magnetic poles 38 arranged in the circumferential direction, and the number of the magnetic poles 38 is determined according to the specifications of the rotating electric machine 10. In the embodiment of FIG. 1, the number of the magnetic poles 38 is eight, and the anticipated angle $\phi$, of one magnetic pole 38 measured in the circumferential direction as viewed from the center position C is 45 degrees. In FIG. 1, the eight magnetic poles 38 are respectively labelled with "P1" to "P8". The magnetic poles 38 denoted as "P1" to "P8" are different from one another only in terms of the arrangement position, and each of the magnetic poles 38 has the same configuration. Thus, a typical one of the magnetic poles 38 having a plurality of magnet holes 50, a plurality of permanent magnets 60, etc. will be described below.

Each of the magnetic poles 38, typically, the magnetic pole P8, has a plurality of magnet holes 50 (see P2) and a plurality of permanent magnets 60 (see P1), which are arranged in the two-layer configuration structure 40. The d-axis 70 as a magnetic-pole centerline CL of the magnetic pole 38 and the outer circumferential surface 36 of the rotor core 32 intersect with each other at a d-axis intersection point 80. The respective layers of the two-layer configuration structure 40 are distinguished from each other, by calling a layer closer to the d-axis intersection point 80 "a first layer 42", and calling a layer farther from the intersection point 80 "a second layer 44", as viewed radially inward from the d-axis intersection point 80. This manner of distinguishing the respective layers also applies to the case where the magnetic pole 38 has a multiple-layer configuration structure having three or more layers. In this case, the layers are successively counted as "first layer", "second layer", "third layer", "fourth layer", . . . radially inwards from the d-axis intersection point 80, from the one closest to the d-axis intersection point 80, to the one farthest from the same point.

The permanent magnets 60 are respectively inserted into and disposed in the corresponding magnet holes 50. In FIG. 1, the permanent magnets 60 are indicated as hatched areas, and the magnet holes 50 are indicated as portions that are not hatched, at longitudinally opposite sides of the permanent magnets 60. It is a little difficult to figure out the shapes of the magnet holes 50 in a condition where the permanent magnets 60 are disposed in the magnet holes 50. Thus, in the magnetic pole P2, the permanent magnets 60 are not illustrated, and only the magnet holes 50 are illustrated. The magnet holes 50 are in the form of through-holes arranged in the circumferential direction, in a radially outer portion of the rotor core 32. The magnet holes 50 extend through the thickness of the rotor core 32, and receive the permanent magnets 60 that are embedded in the rotor core 32

As typically shown in the magnetic pole P2, each magnetic pole 38 has magnet holes 52, 53, 54, 55, as the magnet holes 50. The magnet holes 52, 53 are two magnet holes that belong to the first layer 42, and the magnet holes 54, 55 are two magnet holes that belong to the second layer 44.

The magnet holes 50 serve as holes in which the permanent magnets 60 are inserted. At the same time, in the rotor 30 of embedded magnet type, the magnet holes 50 serve as hollow portions that form magnetic anisotropy of the rotor core 32 necessary to generate reluctance torque. Namely, the magnet holes 50 are hollow portions where magnetic body portions of the rotor core 32 are removed, and have larger magnetic resistance than the magnetic body portions of the rotor core 32. The magnetic permeability of the permanent magnets 60 inserted in the magnet holes 50 is substantially equal to the space permeability; therefore, the permanent magnets 60 provide as high magnetic resistance as that of the hollow portions. Accordingly, magnetic flux in the rotor core 32 does not pass the magnet holes 50, but flows in a magnetic body portion between the magnet holes 52, 53 of the first layer 42, and the magnet holes 54, 55 of the second layer 44.

In the magnetic pole P1, the permanent magnets 62, 63, 64, 65, 66, 67 are indicated as the permanent magnets 60. The permanent magnets 62, 63 are two permanent magnets that belong to the first layer 42, and are inserted in the magnet holes 52, 53, respectively. The permanent magnets 64, 65, 66, 67 are four permanent magnets that belong to the second layer 44, and the permanent magnets 64, 66 are inserted in the magnet hole 54, while the permanent magnet 65, 67 are inserted in the magnet hole 55.

All of the permanent magnets 60 have the same shape, more specifically, have a rectangular cross-sectional shape in a plane perpendicular to the axial direction. Each of the permanent magnets 60 is a bar magnet in the form of a rectangular parallelepiped having an axial length slightly shorter than that of the rotor 30. As a material of the permanent magnets 60, rare-earth magnets, such as a neodymium magnet having neodymium, iron, and boron as major components, and a samarium-cobalt magnet having samarium and cobalt as major components, may be used. Other magnets, such as a ferrite magnet, and an alnico magnet, may also be used.

The permanent magnets 60 are magnetized along their short sides from the radially outer side toward the radially inner side, and the magnetization directions of adjacent ones of the magnetic poles are opposite to each other. For example, in the magnetic pole P1, the radially outer faces of the permanent magnets 62, 63, 64, 65, 66, 67 are magnetized to provide north (N) poles, and the radially inner faces of these magnets are magnetized to provide south (S) poles (see FIG. 2). On the other hand, in the magnetic poles P2, P8 adjacent to the magnetic pole P1, the radially outer faces of the permanent magnets 60 are magnetized to provide S poles, and the radially inner faces are magnetized to provide N poles. As a result, the polarity of the magnetic pole on the radially outer side facing the stator 12 alternately changes from the magnetic pole P1 to the magnetic pole P8, such that the N pole, S pole, N pole, S pole, N pole, S pole, N pole, and S pole are arranged in this order in the circumferential direction. In operation of the rotating electric machine 10, the permanent magnets 60 cooperate with a rotating magnetic field generated by the stator 12, to generate magnet torque.

In FIG. 1, a normal rotational direction 68 of the rotor 30 during operation of the rotating electric machine 10 is indicated. The rotating electric machine 10 can be controlled to rotate in the normal direction and reverse direction. The normal rotational direction 68 is the counterclockwise direction on the paper of FIG. 1, and is the same as the direction in which the U-phase, V-phase, and W-phase windings of the stator 12 are arranged. In FIG. 1, "UP" denotes the upstream side of the normal rotational direction 68, and "DOWN" denotes the downstream side thereof. The normal rotational direction 68 will be used when the flow of magnetic flux of the permanent magnets 60 in the rotor core 32 during operation of the rotating electric machine 10 is analyzed, referring to FIG. 3 and FIG. 4 which will be described later.

The magnetic poles P1 to P8 have the same configuration. Thus, the two-layer configuration structure 40 of the magnetic pole P1 having two permanent magnets 62, 63 belonging to the first layer 42, and four permanent magnets 64, 65, 66, 67 belonging to the second layer 44, will be described in detail, using FIG. 2.

Figure 2:
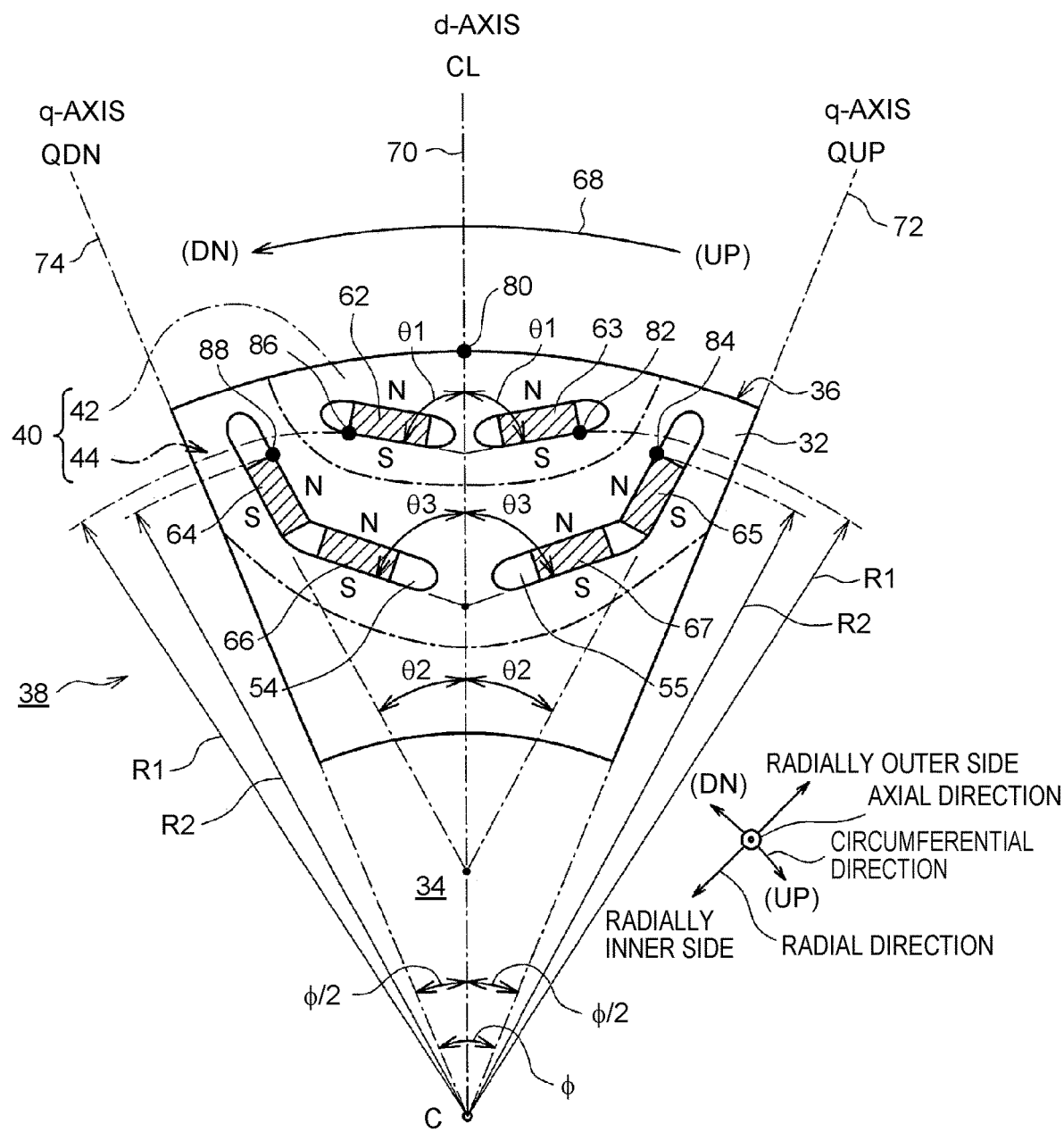
FIG. 2 is an enlarged view of a portion corresponding to one magnetic pole, in a rotor of the rotating electric machine of FIG. 1.

FIG. 2 shows the magnetic-pole centerline CL of the magnetic pole P1. The magnetic-pole centerline CL is a line that passes the center position C and extends radially outward, and divides the anticipated angle $\phi$, taken along the circumferential direction of the magnetic pole P1 as viewed from the center position C, into two, each being equal to $\phi/2$. The magnetic-pole centerline CL is the d-axis 70 in the magnetic pole P1. In FIG. 2, q-axes 72, 74 on the opposite sides of the magnetic pole P1 are boundary lines that pass the center position C, and separate the magnetic pole P1 from the magnetic poles P2, P8 adjacent to the magnetic pole P1. To distinguish the opposite q-axes 72, 74 from each other, the q-axis 72 on the upstream side of the normal rotational direction 68 of the rotor 30 will be denoted as "QUP", and the q-axis 74 on the downstream side will be denoted as "QDN".

The two permanent magnets 62, 63 of the first layer 42 of the two-layer configuration structure 40 are arranged symmetrically with respect to the d-axis 70 as the magnetic-pole centerline CL, such that each of the permanent magnets 62, 63 is inclined by an inclination angle $\theta1$ as a given acute angle, relative to the d-axis 70.

The four permanent magnets 64, 65, 66, 67 of the second layer 44 of the two-layer configuration structure 40 are arranged symmetrically with respect to the d-axis 70, such that two of these magnets are disposed in the magnet hole 54 having a bent shape, and the other two magnets are disposed in the magnet hole 55 having a bent shape. Namely, the permanent magnets 64, 66 are disposed in the magnet hole 54 on the downstream side DN in the circumferential direction, and the permanent magnets 65, 67 are disposed in the magnet hole 55 on the upstream side UP.

The magnet holes 54, 55 are bent symmetrically with respect to the d-axis 70. Thus, the magnet hole 54 on the downstream side DN is taken as a typical one, and the relationship in position between the two permanent magnets 64, 66 disposed in the magnet hole 54 will be described. The permanent magnet 64 is located radially outward of the permanent magnet 66. The permanent magnet 64 is inclined at an inclination angle $\theta2$ as a given acute angle, relative to the d-axis 70. The inclination angle $\theta2$ is an anticipated angle as viewed from the outer circumferential surface 36 side of the rotor core 32. The permanent magnet 66 is located radially inward of the permanent magnet 64. The permanent magnet 66 is inclined at an inclination angle $\theta3$ as a given acute angle, relative to the d-axis 70. The inclination angle $\theta3$ is an anticipated angle as viewed from the outer circumferential surface 36 side of the rotor core 32. The inclination angle θ3 is larger than the inclination angle θ2. The relationship among these inclination angles θ3, θ2 and the inclination angle θ1 is expressed as θ1>θ3>θ2, as shown in FIG. 2.

In each magnetic pole 38 of the embedded magnet type rotor 30, the magnetic flux of the permanent magnets 62, 63, 64, 65, 66, 67 generated when the rotating electric machine 10 rotates flows through a magnetic body portion, or flux path, of the rotor core 32 which is interposed between the first layer 42 and the second layer 44. In this flux path, both the magnetic flux from the permanent magnets 62, 63 belonging to the first layer 42 and the magnetic flux from the permanent magnets 64, 65, 66, 67 belonging to the second layer 44 flow; therefore, interference may occur between the magnetic fluxes if the width of the flux path is small. When the relationship among the inclination angles of the permanent magnets 60 relative to the d-axis 70 is θ1>θ3>θ2, the width of the flux path between the first layer 42 and the second layer 44 becomes larger toward the d-axis 70, and becomes smaller toward the q-axes 72, 74, as shown in FIG. 2. The narrowest portions of the flux path between the permanent magnets 62, 63 of the first layer 42 and the permanent magnets 64, 65, 66, 67 of the second layer 44 that faces the first layer 42 are between the mutually facing permanent magnets that are located closest to the opposite q-axes 72, 74.

On the q-axis 72 side labelled with "QUP" in FIG. 2, the flux path between an end portion 82 on the q-axis 72 side and the radially inner side in the permanent magnet 63 belonging to the first layer 42 and an end portion 84 on the q-axis 72 side and the radially outer side in the permanent magnet 65 belonging to the second layer 44 has the smallest width.

Similarly, on the q-axis 74 side labelled with "QDN" in FIG. 2, the flux path between an end portion 86 on the q-axis 74 side and the radially inner side in the permanent magnet 62 belonging to the first layer 42 and an end portion 88 on the q-axis 74 side and the radially outer side in the permanent magnet 64 belonging to the second layer 44 has the smallest width.

In the case where the relationship among the inclination angles of the permanent magnets 60 relative to the d-axis 70 is θ1>θ3>θ2, the width between the end portion 82 and end portion 84 on the q-axis 72 side is smallest when the end portion 82 and the end portion 84 are located at the same radial position (i.e., the end portion 82 and the end portion 84 have the same radius as measured from the center position C). Where R1 represents the radial position or radius of the end portion 82 as measured from the center position C of the rotor core 32, and R2 represents the radial position or radius of the end portion 84, the width between the end portion 82 and end portion 84 on the q-axis 72 side is smallest when R1 is equal to R2 (R1=R2). When the end portion 84 is shifted radially inward relative to the end portion 82, so that R1 becomes larger than R2 (R1>R2), the width between the end portion 82 and the end portion 84 becomes larger than that in the case where R1 is equal to R2 (R1=R2). This also applies to the relationship between the end portion 86 and end portion 84 on the q-axis 74 side.

Thus, R1 is set to be larger than R2 (R1>R2), so as to reduce interference between the magnetic flux of the permanent magnets belonging to the first layer 42, and the magnetic flux of the permanent magnets belonging to the second layer 44, in the flux path interposed between the first layer 42 and the second layer 44. Namely, the end portion 82 on the q-axis side and the radially inner side in the permanent magnet 63 belonging to the first layer 42 and located closest to the q-axis 72 is located radially outward of the end portion 84 on the q-axis side and the radially outer side in the permanent magnet 65 belonging to the second layer 44 and located closest to the q-axis 72. This also applies to the relationship between the end portion 86 and the end portion 88. A radial spacing ΔRth (=R1−R2) is set to a predetermined value, by obtaining the relationship between the maximum torque characteristic, etc. and ΔRth by experiment or simulation, based on actual operating conditions of the rotating electric machine 10, for example.

In the case as described above, two permanent magnets belong to the first layer 42, and four permanent magnets belong to the second layer 44, while the relationship among the inclination angles of these permanent magnets relative to the d-axis 70 is θ1>θ3>θ2. The above relationship for reducing interference in the flow of the magnetic flux between two adjacent layers may also be applied to the case where the permanent magnets in the magnetic pole 38 have a plural-layer structure having three or more layers. Also, in the case of the embedded magnet type rotor that employs a plural-layer structure for arrangement of permanent magnets, the spacing between permanent magnets belonging to a layer close to the d-axis intersection point 80, and permanent magnets belonging to a layer far from the intersection point 80, may be likely to be set to be the narrowest on the q-axis side, as shown in FIG. 2 by way of example. The above relationship for reducing interference in the flow of the magnetic flux between two adjacent layers may also be applied to this case.

Figure 3:
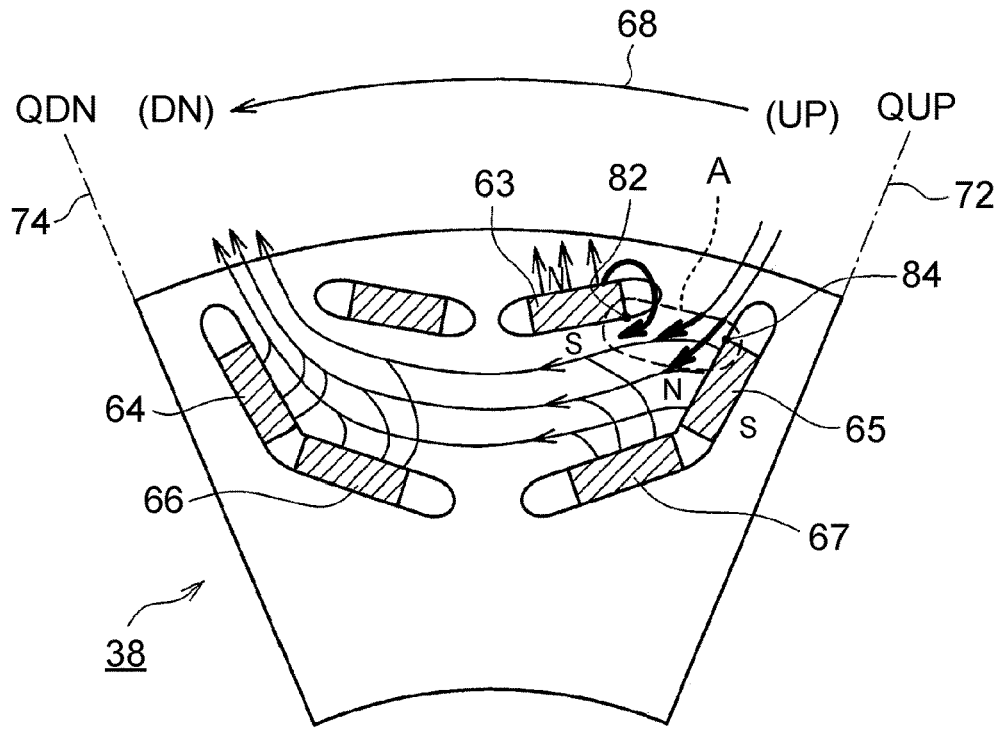
FIG. 3 is a view showing flow of magnetic flux in the magnetic pole of FIG. 2 when the rotating electric machine operates and the rotor rotates, in particular, showing magnetic saturation that appears when magnetic fluxes of permanent magnets of two layers intensify each other.
Figure 4:
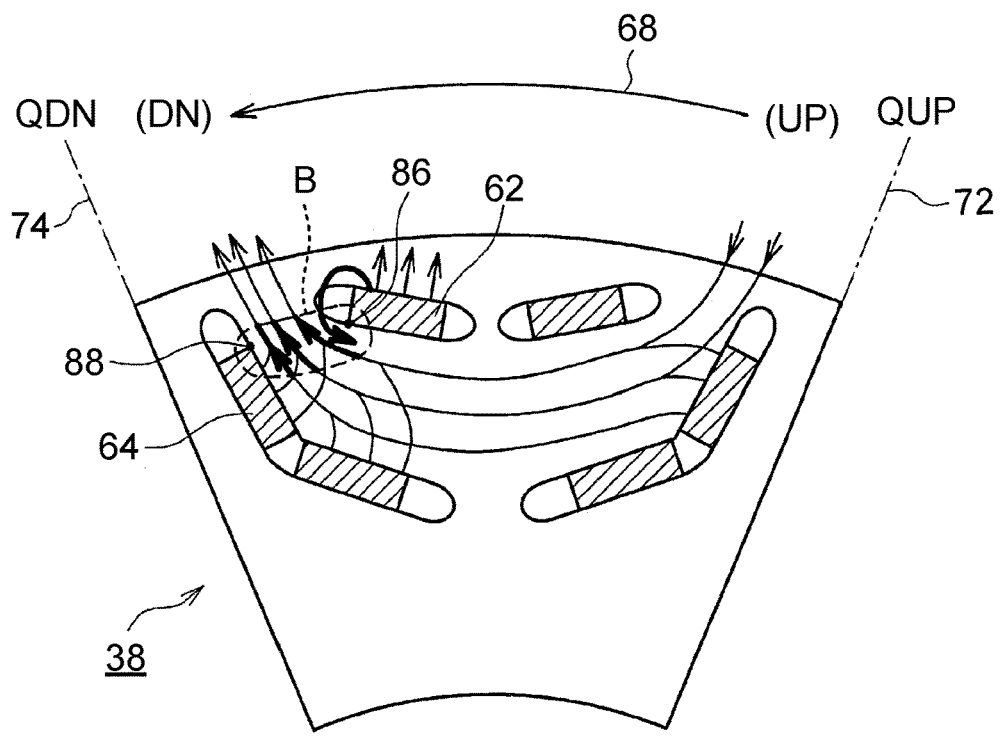
FIG. 4 is a view showing flow of magnetic flux in the magnetic pole of FIG. 2 when the rotating electric machine operates and the rotor rotates, as in FIG. 3, in particular, showing mutual canceling of magnetic fluxes caused by interference between magnetic fluxes of permanent magnets of two layers.

The operation and effect of the above configuration will be described using FIG. 3 and FIG. 4. FIG. 3 and FIG. 4, which correspond to FIG. 2, show flow of magnetic flux in the magnetic pole 38 when the rotating electric machine 10 operates and the rotor 30 rotates in the normal rotational direction 68. When the rotor 30 rotates in the normal rotational direction 68, magnetic flux flows from the q-axis 72 side denoted as "QUP". Then, magnetic flux from each of the permanent magnets 65, 67, 66, 64 of the second layer 44 in the magnetic pole 38 joins the magnetic flux, and the resulting magnetic flux passes through the flux path between the first layer 42 and the second layer 44, toward the q-axis 74 side denoted as "QDN".

FIG. 3 particularly shows flow of magnetic flux in the vicinity of a flux flow inlet of the q-axis 72 denoted as "QUP". In the vicinity of the flux flow inlet of the q-axis 72, magnetic flux from the N pole of the permanent magnet 63 of the first layer 42 turns around and enters into the flux path between the first layer 42 and the second layer 44. The direction of the magnetic flux that turns around is the same direction as the direction of magnetic flux flowing from the q-axis 72 toward the q-axis 74. As a result, the magnetic fluxes intensify each other, and magnetic saturation is likely to occur, in a flux path region A between the end portion 82 of the permanent magnet 63 and the end portion 84 of the permanent magnet 65. Thus, ΔRth (=R1−R2), where R1 is the radial position of the end portion 82 as measured from the center position C of the rotor core 32, and R2 is the radial position of the end portion 84, is set to a predetermined radial spacing ΔRth1 that can reduce a possibility of magnetic saturation caused by the mutual intensification of the magnetic fluxes. The relationship between the maximum torque characteristic, etc. and magnetic saturation is obtained by experiment or simulation, based on operating conditions of the rotating electric machine 10, for example, and the radial spacing ΔRth1 is set to a value at which the maximum torque characteristic, etc. will not deteriorate.

FIG. 4 particularly shows flow of magnetic flux in the vicinity of a magnetic flux outlet of the q-axis 74 denoted as "QDN". In the vicinity of the magnetic flux outlet of the q-axis 74, magnetic flux turns around from the N pole of the permanent magnet 63 of the first layer 42, and enters into the flux path between the first layer 42 and the second layer 44. The direction of the magnetic flux that turns around is opposite to the direction of the magnetic flux flowing from the q-axis 72 toward the q-axis 74. As a result, the magnetic fluxes cancel out each other, and the effective magnetic flux is likely to be reduced, in a flux path region B between the end portion 86 of the permanent magnet 62, and the end portion 88 of the permanent magnet 64. Thus, ΔRth (=R1−R2), where R1 is the radial position of the end portion 86 as measured from the center position C of the rotor core 32, and R2 is the radial position of the end portion 88, is set to a predetermined radial spacing ΔRth2 that can reduce a possibility of mutual cancelling of the magnetic fluxes. The relationship between the maximum torque characteristic, etc. and the effective magnetic flux is obtained by experiment or simulation, based on operating conditions of the rotating electric machine 10, for example, and the radial spacing ΔRth2 is set to a value at which the maximum torque characteristic, etc. will not deteriorate.

As described above, when the rotating electric machine 10 operates, and the rotor 30 rotates, magnetic saturation is likely to occur due to mutual intensification of magnetic fluxes by the permanent magnets of two layers at around the q-axis 72 on the upstream side of the normal rotational direction 68. Also, magnetic fluxes produced by the permanent magnets of two layers at around the q-axis 74 on the downstream side are likely to cancel out each other. When the plural-layer structure of the permanent magnets is not symmetrical with respect to the d-axis 70, only one of these phenomena may take place. Accordingly, ΔRth1 and ΔRth2 are preferably set as appropriate, according to the content of the plural-layer structure of the rotor 30.

When the plural-layer structure of the permanent magnets is symmetrical with respect to the d-axis 70, as shown in FIG. 2, R1 and R2 on the q-axis 72 side are equal to R1 and R2 on the q-axis 74 side. Accordingly, the predetermined radial spacing ΔRth1 at the q-axis 72 side on the upstream side of the rotational direction can be made equal to the predetermined radial spacing ΔRth2 at the q-axis 74 side on the downstream side. As a result, magnetic saturation and mutual cancellation of magnetic fluxes can be curbed or reduced in a well-balanced manner.

As described above, in the flux path between two adjacent layers in the plural-layer structure, magnetic fluxes produced by the permanent magnets of the two layers are likely to interfere with each other, in a region where two permanent magnets closest to the q-axis as an inlet of flow of magnetic flux that generates magnet torque in the magnetic pole face each other. For example, on the q-axis 72 side in the configuration of FIG. 2, magnetic fluxes are likely to interfere with each other, in the region where the end portion 82 on the q-axis 72 side and the radially inner side in the permanent magnet 63 belonging to the first layer 42 and located close to the d-axis intersection point 80, and the end portion 84 on the q-axis 72 side and the radially outer side in the permanent magnet 65 belonging to the second layer 44 and located far from the intersection point 80, face each other. According to the above configuration, the end portions of the permanent magnets that face each other are spaced from each other by the predetermined radial spacing. Accordingly, by appropriately setting the predetermined radial spacing, it is possible to curb or reduce interference between the magnetic fluxes of the permanent magnets of the adjacent layers, mitigate magnetic saturation, and curb deterioration of the maximum torque characteristic, etc.

What is claimed is:

1. A rotating electric machine, comprising:
   a stator on which a stator coil is wound; and
   a rotor disposed on a radially inner side of the stator, concentrically with the stator, with a predetermined clearance between the rotor and the stator, the rotor including a rotor core having a plurality of magnetic poles arranged in a circumferential direction, and a plurality of permanent magnets, the permanent magnets in each of the magnetic poles being arranged in a plural-layer structure that extends radially inward from a d-axis intersection point at which a d-axis intersects with an outer circumferential surface of the rotor core, wherein:
   the plural-layer structure is a two-layer structure, which includes a first layer and a second layer as two adjacent layers, the first layer being closer to the d-axis intersection point than the second layer, the permanent magnets that belong to the first layer and the second layer respectively including first and second outermost permanent magnets located closest to each of opposite q-axes of the each magnetic pole, the first and second outermost permanent magnets being located relative to each other, such that a radial position of an end portion on a q-axis side and a radially inner side in the first outermost permanent magnet of the first layer, is spaced by a predetermined radial spacing from, and is on a radially outer side of, a radial position of an end portion on the q-axis side and a radially outer side in the second outermost permanent magnet of the second layer;
   the first layer comprises two permanent magnets arranged symmetrically with respect to the d-axis and inclined at a first inclination angle θ1 as a predetermined acute angle, relative to the d-axis, as viewed from the outer circumferential surface of the rotor core;
   the second layer comprises four permanent magnets comprising two radially outer permanent magnets that are arranged symmetrically with respect to the d-axis and inclined at a second inclination angle θ2 that is smaller than the first inclination angle θ1, relative to the d-axis, as viewed from the outer circumferential surface of the rotor core, and two radially inner permanent magnets that are arranged symmetrically with respect to the d-axis and inclined at a third inclination angle θ3 that is an acute angle smaller than the first inclination angle θ1 and larger than the second inclination angle θ2, relative to the d-axis, as viewed from the outer circumferential surface of the rotor core; and
   a relationship between the first inclination angle, the second inclination angle, and the third inclination angle is expressed as θ1>θ3>θ2.

2. The rotating electric machine according to claim 1, wherein the predetermined radial spacing is set to a spacing that reduces a possibility of magnetic saturation caused by mutual intensification of magnetic flux of the permanent magnets that belong to the first layer, and magnetic flux of the permanent magnets that belong to the second layer, when the magnetic flux of the permanent magnets that belong to the first layer flows in the same direction as the magnetic flux of the permanent magnets that belong to the second layer.

3. The rotating electric machine according to claim 1, wherein the predetermined radial spacing is set to a spacing that reduces a possibility of mutual cancelling of magnetic flux of the permanent magnets that belong to the first layer, and magnetic flux of the permanent magnets that belong to the second layer, when the magnetic flux of the permanent magnets that belong to the first layer flows in a direction opposite to a direction in which the magnetic flux of the permanent magnets that belong to the second layer flows.

4. The rotating electric machine according to claim 1, wherein the permanent magnets of each layer of the plural-layer structure are arranged symmetrically with respect to the d-axis.

\* \* \* \* \*